F. A. HAZEL.
RENEWABLE LICENSE TAG.
APPLICATION FILED NOV. 21, 1917.
1,257,705. Patented Feb. 26, 1918.
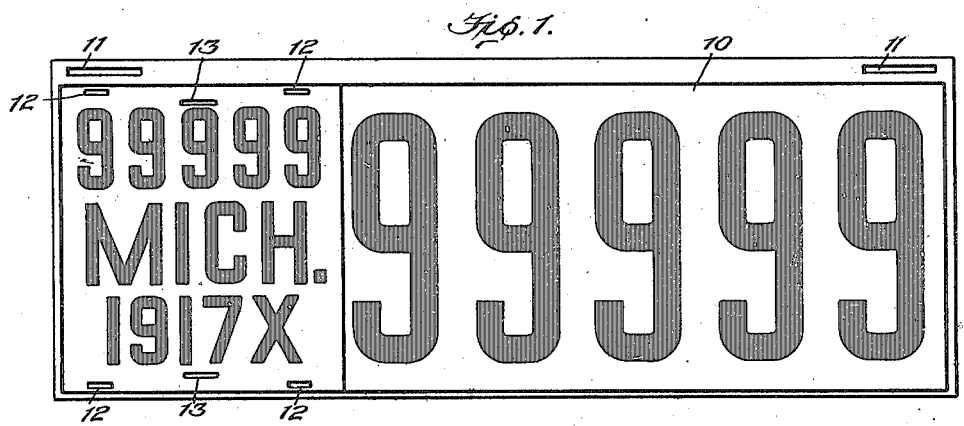
Fig. 1.
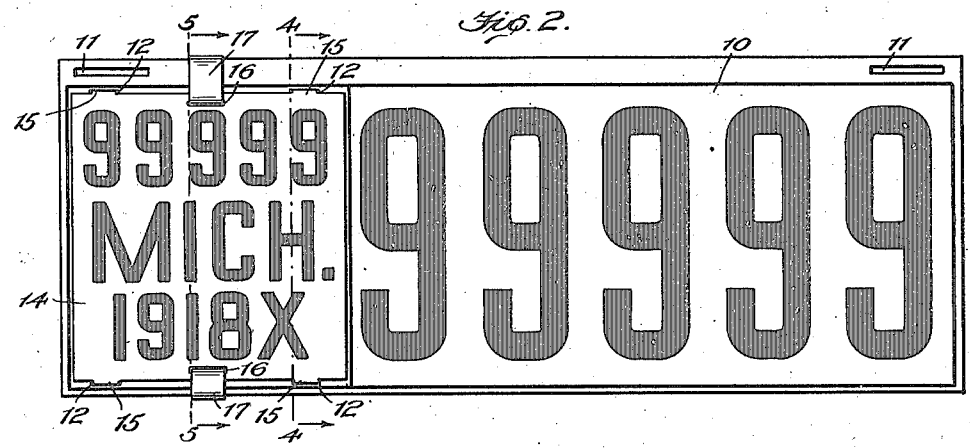
Fig. 2.
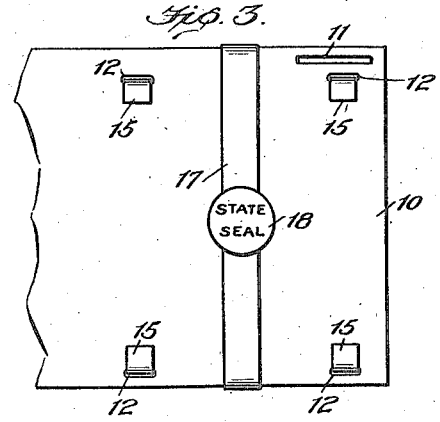
Fig. 3.
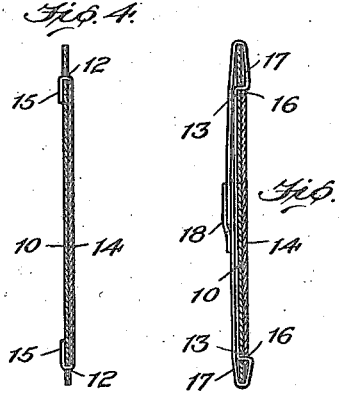
Fig. 4.
Fig. 5.
Witness
Edwin L. Bradford
Inventor
Frank A. Hazel,
By Wm E. Dyre
Attorney

UNITED STATES PATENT OFFICE.

FRANK ALFONSO HAZEL, OF PASCOAG, RHODE ISLAND.

RENEWABLE LICENSE-TAG.

1,257,705.    Specification of Letters Patent.    Patented Feb. 26, 1918.

Application filed November 21, 1917. Serial No. 203,158.

*To all whom it may concern:*

Be it known that I, FRANK A. HAZEL, a citizen of the United States, residing at Pascoag, in the county of Providence and State of Rhode Island, have invented certain new and useful Improvements in Renewable License-Tags; and I do hereby declare the following to be a full, clear, and exact description of the invention, such as will enable others skilled in the art to which it appertains to make and use the same.

My invention relates to changeable exhibitors or signs, but has reference more particularly to license tags for use on automobiles and other vehicles. Generally stated, it comprises a metallic plate containing a license number, and a secondary detachable or renewable plate carrying a suitable inscription, such as the name of a particular State, and the year for which license was issued. The present invention also comprises novel means for connecting the said main and secondary license plates, and for sealing them in their associated operative relation thus rendering separation impossible without detection.

For an object the present invention contemplates the production of license tags of extremely simple and inexpensive construction; tags which are practically perpetual, in that succeeding year and State designations may be readily supplied under official supervision, including means for officially sealing the same in operative position; and means for readily changing the color, from year to year, of the renewable tag members or lettering thereon.

With the foregoing and other objects in view the invention will now be particularly described, and later pointed out by the appended claims.

In the accompanying drawings which form part of this application for letters patent, and whereon corresponding numerals indicate like parts in the several views:

Figure 1 is a plan view of the case or main license plate having embossed or otherwise imprinted thereon suitable characters, and provided with fastening slots in its upper edge.

Fig. 2 is a plan view of the said main base plate with a secondary renewable license plate or card secured thereto in operative position.

Fig. 3 is a fragmentary view showing the reverse side of Fig. 2 at the end carrying the renewable secondary plate or license card.

Fig. 4 is a vertical transverse sectional view through both plates on the line 4—4 of Fig. 2, and Fig. 5 is also a transverse vertical view similar to Fig. 4, but taken on the line 5—5 of the said Fig. 2.

Reference being had to the drawings and numerals thereon, 10 indicates a main base plate preferably of sheet metal bearing appropriate license numbers and data such as indicated by Fig. 1 of the drawings, the same being slotted longitudinally in its upper edge as at 11, 11, to provide for attachment to an automobile or other vehicle, slotted at 12, 12, to permit the attachment of a secondary or renewable license plate or card, and slotted as at 13, 13, for the reception of a suitable sealing band.

The numeral 14 indicates a secondary license plate which also contains and displays appropriate data such as a license number, State and year designations, the same being provided adjacent all four corners with oppositely disposed integral and flexible securing tangs 15, and provided also in its upper and lower edges with horizontal slots 16, 16, for reception of a flexible sealing strip 17 preferably of metal, for lacing the main and secondary license plates together through their respective sealing slots 13, 13, 16 and 16, in such manner that the display surface or face at neither plate is obstructed from view, the overlapping ends of said strip 17 being then connected by an official seal 18, as indicated by Figs. 2, 3 and 5 of the drawings.

The foregoing being a description of my invention, its use and operation are sufficiently apparent to render unnecessary further description, although attention may be directed to the ease and facility with which an expired secondary license plate 14 may be removed and one for the current new year substituted after the seal 18 has first been broken. The tangs 15 of such new plate—which plate may, if desired, be of a different and distinctive color—are first bent at right angles. Strap 17 is next looped through slots 16, 16, from the back of plate 14, tangs 15 passed through their respective slots 12 and clenched over the back of plate 10, the ends of strap 17 being then overlapped as shown by Fig. 5, and there secured by a suitable seal 18 against accidental or fraudulent removal.

This being a description of my invention, what I claim and desire to secure by Letters Patent is:

1. In a license tag the combination of a main plate, a secondary display plate, means for removably connecting said plates, a sealing strap threaded through registering openings in both of said plates, and means for fastening the ends of said strap.

2. In a license tag the combination of a main plate, a secondary display plate, means for removably connecting said plates, a sealing strap threaded through both of said plates without obscuring the display surfaces thereof, and means for fastening the ends of said strap upon the reverse side of the structure.

In testimony whereof I affix my signature, in presence of two subscribing witnesses.

FRANK ALFONSO HAZEL.

Witnesses:
FRED W. TROPP,
MARTIN H. SCHUNKERSEN.